Patented Dec. 20, 1949

2,491,920

UNITED STATES PATENT OFFICE 2,491,920

DIESTERS OF 1-KETOPHOSPHONIC ACIDS

Maurice Leon Ernsberger, Wilmington, Del., assignor to E. I. du Pont de Nemours & Company, Wilmington, Del., a corporation of Delaware No Drawing. Application May 16, 1946,
Serial No. 670,295

17 Claims. (Cl. 260—461)

This invention relates to new organic compounds of phosphorus. More particularly, it relates to new esters of 1-ketophosphonic acids.

An object of this invention is to make available a new class of organic compounds, the diesters of 1-ketophosphonic acids. Another object is to provide a process for preparing these new esters. Another object is to prepare polymeric derivatives of polymerizable 1-ketophosphonic acid esters. Other objects will appear hereinafter.

These objects are accomplished by the invention of diesters of 1-ketophosponic acids and the polymers of certain of them and of a process for preparing such products which comprises reacting a carboxylic acid chloride or bromide with a neutral phosphite ester and isolating the product.

The new products of this invention have the general formula

wherein R and R' are monovalent hydrocarbon radicals, saturated or unsaturated, but preferably alkyl. The reaction leading to these products is illustrated by the following equation which represents the formation of diethyl 1-ketoethanephosphonate from acetyl chloride and triethyl phosphite as described in Example I below.

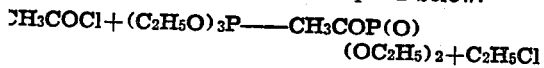

The invention is illustrated by the following examples wherein parts are by weight.

EXAMPLE I

Diethyl 1-ketoethanephosphonate, $CH_3COP(O)(OC_2H_5)_2$

One hundred fifty-six parts of acetyl chloride was placed in a reaction vessel equipped with stirring means, addition means, and a condenser, the open end of which was attached to a trap cooled in a mixture of "Dry Ice" and acetone. Fifty-five parts of triethyl phosphite was added dropwise while maintaining the temperature below reflux. When the addition was complete the reaction mixture was refluxed for one-half hour. At this time the "Dry Ice" cold trap was found to contain 9 parts of ethyl chloride boiling at 8–13° C. The reaction mixture was fractionated and after removing the excess acetyl chloride, 40.5 parts, or 67 per cent of the theoretical amount of diethyl 1-ketoethanephosphonate was collected, B. P. 114–115° C., at 20 mm. or 83° C. at 4 mm. Refractive index 1.4200 at 26° C.

Analysis—Calculated for $C_6H_{13}O_4P$: C, 40.00; H, 7.25; P, 17.2. Found: C, 40.42; H, 7.46; P, 16.51, 16.55.

Diethyl 1-ketoethanephosphonate is soluble in water, or in dilute alkali with the evolution of heat. It does not react with 2,4-dinitrophenylhydrazine test reagent. It is decomposed on boiling with water with the formation of acetic acid. An aqueous solution of 9.0 g. of this ester in 10 cc. of water was refluxed for one-half hour. This reaction mixture was distilled and the condensed volatile liquid was neutralized with sodium hydroxide and evaporated to dryness. The dry salt was used in preparing a p-bromophenacyl ester which melted at 82–83.5° C. (Corr.) after repeated recrystallization from alcohol. The p-bromophenacyl ester of acetic acid is reported to melt at 85° C.

EXAMPLE II

Diethyl 1 - keto-2-methyl-2-propenephosphonate polymers $[CH_2=C(CH_3)COPO(OC_2H_5)_2]_x$ Forty parts of methacrylyl chloride, B. P. 97.5–98.5° C. stabilized with hydroquinone, was placed in a reaction vessel equipped with a thermometer, stirring means, addition means, and a condenser. Fifty-five parts of triethyl phosphite was added dropwise while holding the temperature of the reaction mixture at 40–55° C. by means of external cooling. A steady stream of gas was evolved during the addition which was completed in about thirty minutes. The reaction mixture was then heated to 85–90° C. for twenty minutes. About ten parts of low boiling material was removed by heating under a vacuum of 5 mm. at a temperature of 200° C. The 56 parts of residue represented a yield of 59 per cent of the theory of a polymer of diethyl 1-keto-2-methyl-2-propenephosphonate.

Analysis—Calculated for $(C_8H_{15}O_4P)$: C, 46.6; H, 7.28; P, 15.05; molecular weight $(206)_x$. Found: C, 45.68; H, 7.45; P, 15.02; molecular weight (ebullioscopic in benzene) 480; 450.

The polymer was a viscous, water-soluble liquid which acquired a grease-like consistency on storage. It decolorized bromine in carbon tetrachloride solution and could be salted out of an aqueous solution by adding sodium bisulfite. Addition of benzoyl peroxide followed by heating resulted in the formation of a very viscous oil which had a molecular weight (ebullioscopic in alcohol) of 532; 510.

The invention has been described with particular reference to diethyl 1-ketoethanephosphonate and diethyl 1-keto-2-methyl-2-propenephosphonate since these compounds are typical representatives of the class of esters of 1-ketophosphonic acids. However, the invention is generally applicable to the preparation of diesters of 1-ketophosphonic acids and particularly those of the formula

wherein R and R' are monovalent hydrocarbon radicals, preferably of not more than six carbon atoms. In the polymerizable members R has a methylene group attached by an olefinic double bond to the carbon attached to the CO group. In the preparation of the diesters of 1-ketophosphonic acids there may be used, in general, the ortho-esters of phosphorous acid having the three hydrogens replaced by hydrocarbon radicals including, in addition to the triethyl phosphite of the examples, trimethyl phosphite, triallyl phosphite, tricyclohexyl phosphite, tribenzyl phosphite, triphenyl phosphite, as well as mixed phosphites. The trialkyl phosphites, particularly the lower alkyl esters having up to six carbon atoms in the alkyl group, are preferred.

While the invention has been illustrated with acetyl and methacrylyl chlorides, monocarboxylic acid chlorides and bromides in general may be employed, including propionyl chloride, benzoyl chloride, phenylacetyl bromide, trimethylacetyl chloride, isobutyryl bromide, acetyl bromide, trichloroacetyl chloride, cinnamoyl chloride, oleic acid chloride, propargylic acid chloride, crotonyl bromide, sorbic acid chloride, beta-furylacrylic acid chloride, etc. The acyl chlorides and bromides of the saturated and unsaturated fatty acids having up to six carbon atoms are preferred because they are cheaper, more readily available, and lend themselves particularly well to reaction.

For the preparation of polymerizable esters the acid chloride or bromide is preferably an alpha methylene acid chloride or bromide, i. e. one having a methylene group attached by an olefinic double bond to the carbon alpha to the COCl or COBr group.

The reaction between the triester of phosphorous acid and the acyl halide may be carried out at any temperature, up to the decomposition point of the reactants, which permits a suitable rate of reaction. In general, this temperature is above 20° C., preferably between 25 and 200° C.

It is convenient to remove the by-product hydrocarbon halide as it forms to prevent side-reaction of this halide with the phosphite. The reaction may, however, be carried out in a closed vessel under pressure, bleeding off the hydrocarbon halide if desired. In general, no solvent is necessary, but a solvent or diluent may be used to aid in lowering the reaction rate when violent reaction occurs or in promoting the reaction when sluggish as with high molecular weight reactants. It is best to use substantially equivalent amounts of reactants though an excess of one or the other will do no harm. In particular an excess of the acyl halide may be desirable to prevent side reaction with the by-product hydrocarbon halide. The product is conveniently isolated by distillation if a liquid, by crystallization if a solid, or as the polymer in the case of esters of unsaturated ketophosphonic acids. In the last case the product may be purified by fractional precipitation or by chemical and physical treatment to remove contaminating materials.

The unsaturated 1-ketophosphonic acid esters may be isolated and purified through distillation in their monomeric form and then polymerized or copolymerized with suitable catalysts such as benzoyl peroxide, persulfate-bisulfite, boron fluoride, or aluminum chloride catalysts. They may also be polymerized in part during their isolation and subsequently polymerized to a higher polymer as illustrated in the examples or they may be polymerized without isolation at all. Heat, oxygen, and ultraviolet light may also be used to catalyze the polymerization and bulk, emulsion, granular, or solution techniques may be used.

The products of this invention are of interest as plasticizers for polymers and copolymers, as modifying agents for internal combustion engine fuels, for instance as metal deactivators, as addition agents for lubricating oils and as stabilizers for polymers, oils, and hydrocarbons.

The foregoing detailed description has been given for clearness of understanding only and no unnecessary limitations are to be understood therefrom. The invention is not limited to the exact details shown and described for obvious modifications will occur to those skilled in the art.

What is claimed is:

1. Diethyl 1-ketoethanephosphonate.
2. A diester of a 1-ketophosphonic acid said ester having the formula R—CO—PO(OR')₂ wherein R and R' are alkyl radicals of not more than six carbon atoms.
3. Diethyl 1-keto-2-methyl-2-propenephosphonate.
4. A polymer of diethyl 1-keto-2-methyl-2-propenephosphonate.
5. A diester of a 1-ketophosphonic acid said ester having the formula R—CO—PO(OR')₂ wherein R' is an alkyl radical of not more than six carbon atoms and R is an acyclic hydrocarbon radical of not more than six carbons and contains a methylene group attached by an olefinic double bond to the carbon alpha to the CO group.
6. A polymer of a diester of a 1-ketophosphonic acid said ester having the formula
R—CO—PO(OR')₂
wherein R' is an alkyl radical of not more than six carbon atoms and R is an acyclic hydrocarbon radical of not more than six carbons and contains a methylene group attached by an olefinic double bond to the carbon alpha to the CO group.
7. A diester of a 1-ketophosphonic acid said ester having the formula R—CO—PO(OR')₂ wherein R and R' are acyclic hydrocarbon radicals.
8. A diester of a 1-ketophosphonic acid said ester having the formula R—CO—PO(OR')₂ wherein R and R' are acyclic hydrocarbon radicals of not more than six carbon atoms.
9. A diester of a 1-ketophosphonic acid said ester having the formula R—CO—PO(OR')₂ wherein R and R' are alkyl radicals.
10. Process of preparing diesters of 1-ketophosphonic acid which comprises reacting an ortho-ester of phosphorous acid with a member of the class consisting of monocarboxylic acid chlorides and bromides.

11. Process of preparing diesters of 1-ketophosphonic acid which comprises reacting an orthoester of phosphorous acid with a monocarboxylic acid chloride.

12. Process of preparing diesters of 1-ketophosphonic acids which comprises reacting a trialkyl phosphite with a saturated fatty acid chloride.

13. Process of preparing diethyl 1-ketophosphonate which comprises reacting triethyl phosphite with acetyl chloride.

14. A diester of a 1-ketophosphonic acid which acid is acyclic hydrocarbon except for the phosphono group and the oxo oxygen and wherein the two acid hydrogens of the acid are replaced by monovalent acyclic hydrocarbon radicals.

15. A liquid polymer of diethyl 1-keto-2-methyl-2-propenephosphonate.

16. A liquid polymer of a diester of a 1-ketophosphonic acid said ester having the formula R—CO—PO(OR')$_2$ wherein R' is an alkyl radical of not more than six carbon atoms and R is an acyclic hydrocarbon radical of not more than six carbons and contains a methylene group attached by an olefinic double bond to the carbon alpha to the CO group.

17. A liquid diester of a 1-ketophosphonic acid which acid is acyclic hydrocarbon except for the phosphono group and the oxo oxygen and wherein the two acid hydrogens of the acid are replaced by monovalent acyclic hydrocarbon radicals.

MAURICE LEON ERNSBERGER.

REFERENCES CITED

The following references are of record in the file of this patent:

UNITED STATES PATENTS

| Number | Name | Date |
|---|---|---|
| 2,389,576 | Kosolapoff | Nov. 20, 1945 |
| 2,397,422 | Kosolapoff | Mar. 26, 1946 |

OTHER REFERENCES

Kabachnik et al., "Bull. acad. sci. U.S.S.R. Classe Sci. Chim., vol. 1945, No. 4, pp. 364 to 374, also page 408.

Chemical Abstracts, vol. 40 (1946), columns 4688 and 4689 (abstract of above publication).

Brooks, Journal of American Chemical Society 34, 496 (1912).

Kosolapoff, Journal American Chemical Society 66, 109 (1944).

Stelling, Zeitschr Phys. Chem. 117, 204–5 (1925).